United States Patent [19]
Masuda et al.

[11] Patent Number: 5,320,062
[45] Date of Patent: Jun. 14, 1994

[54] ILLUMINATED SLIT POINTER DEVICE FOR VEHICLE INSTRUMENT

[75] Inventors: Michihisa Masuda; Tadashi Iino; Kunimitsu Aoki, all of Shizuoka, Japan

[73] Assignee: Yazaki Corporation, Tokyo, Japan

[21] Appl. No.: 987,812

[22] Filed: Dec. 9, 1992

[30] Foreign Application Priority Data

Dec. 11, 1991 [JP] Japan ............... 3-102143[U]
Jun. 5, 1992 [JP] Japan ............... 4-038170[U]

[51] Int. Cl.$^5$ ............... G02B 5/08; G08B 5/36; G01D 11/28; F21Q 3/00
[52] U.S. Cl. ............... 116/48; 116/286; 362/29; 362/343; 359/533
[58] Field of Search ............... 116/202, 48, 49, 286; 40/479; 362/343, 28, 29; 359/534, 529

[56] References Cited

U.S. PATENT DOCUMENTS

| | | | |
|---|---|---|---|
| 2,179,161 | 11/1939 | Rambusch et al. | 362/343 X |
| 3,633,161 | 1/1972 | Price | 359/522 X |
| 4,068,931 | 1/1978 | Weaks | 362/343 X |
| 4,218,726 | 8/1980 | Fukasawa et al. | 116/48 X |
| 4,598,976 | 7/1986 | McNett | 359/522 |
| 5,038,259 | 8/1991 | Katoh et al. | 362/343 X |
| 5,046,818 | 9/1991 | Barnes | 359/534 |
| 5,103,381 | 4/1992 | Uke | 362/343 X |
| 5,103,385 | 4/1992 | Federico et al. | 362/298 |
| 5,113,321 | 5/1992 | Suzuki | 362/343 X |
| 5,182,663 | 1/1993 | Jones | 359/529 |
| 5,215,370 | 6/1993 | Kaplan | 362/298 |

FOREIGN PATENT DOCUMENTS

| | | | |
|---|---|---|---|
| 1095418 | 6/1955 | France | 359/522 |
| 54-41762 | 4/1979 | Japan . | |
| 425138 | 3/1935 | United Kingdom | 359/533 |

Primary Examiner—Daniel M. Yasich
Attorney, Agent, or Firm—Sughrue, Mion, Zinn, Macpeak & Seas

[57] ABSTRACT

A pointer for use in an instrument panel, such as a speedometer, in a vehicle. According to one embodiment, the pointer includes a conically shaped pointer body to which a pointer base is secured. A light source is disposed within the pointer base and a slit is provided in the body. The inner surface of the pointer body is reflective such that light directed from the light source is reflected off of the reflective surface and through the slit. In another embodiment the light source is disposed externally of the pointer and a reflecting member is provided in the pointer for reflecting the light towards the distal end of the conical body. The reflecting member can include a reflecting mirror or, alternatively, a prism.

5 Claims, 8 Drawing Sheets

ILLUMINATED SLIT POINTER DEVICE FOR VEHICLE INSTRUMENT

BACKGROUND OF THE INVENTION

1. Field of the Invention

This invention relates to pointer device for an instrument, such as a speedometer, in a vehicle, and more particularly to a pointer device for an instrument wherein the pointer is self-illuminating when light is radiated into the pointer.

2. Background

A conventional pointer device of this type includes a rotatable pointer designed to point to a graduated mark on a scale plate as an indication of a measured parameter. The pointer is made of a transparent material such as acrylic resin. A light source is provided at the base of the pointer, or alternatively, light from a light source is directed to the base of the pointer, so that light emitted from the light source is transmitted to the tip of the pointer from the base, thereby illuminating the entire pointer.

While the material of the above-described conventional pointer is transparent, it is a pure resin material. Therefore, the light decreases in intensity as it advances toward the tip of the pointer, as a result of which the base is illuminated to a greater degree than the tip and correspondingly, the pointer is not uniformly illuminated. In order to eliminate this difficulty; that is, in order to uniformly illuminate the pointer from the base to the tip, a variety of methods have been proposed in the art. However, in these methods, the degree of illumination is based on the minimal illumination thereby reducing overall illumination of the pointer body. Hence, none of the methods are effective in illuminating the pointer with a sufficiently high intensity.

In order to overcome this difficulty, there has been proposed a pointer which illuminates with a high intensity. For instance, a cold cathode ray tube is employed as a pointer, or a number of light emitting diodes are arranged in parallel to form a pointer. These pointers are advantageous in that they are highly illuminating because they are made of a light source or a plurality of light sources. However, these pointers are still disadvantageous in that they are expensive, and relatively heavy. Therefore, the load applied to the movement for driving the pointer must be relatively large, and the movement is unavoidably bulky.

SUMMARY OF THE INVENTION

Accordingly, an object of this invention is to provide a pointer device for an instrument of a vehicle which illuminates with a high degree of intensity, and is reduced in weight.

According to an aspect of this invention, there is provided a pointer device for an instrument of a vehicle which comprises a pointer which is fixedly secured to the rotary shaft of a movement and is illuminated by light radiated into the pointer. The pointer comprises a pointer body which is in the form of a conical cylinder, and a pointer base secured to the rotary shaft of the movement, the pointer body having a slit in the side thereof which extends longitudinally of the pointer body, and a reflecting surface as the inner surface thereof which reflects light directed into the pointer body through a bottom opening, thus causing the slit to be illuminated.

According to another aspect of the invention, there is provided pointer device for an instrument of a vehicle which comprises a pointer fixedly secured to the rotary shaft of a movement and illuminated by light radiated into the pointer. The pointer is made up of a conical portion having a reflective inner surface and having a slit in the side thereof which extends longitudinally of the conical portion. An opening is provided in the side of the conical portion in alignment with the rotary shaft of the movement, and a reflecting member is arranged inside the conical portion in such a manner that light radiated into the conical portion through the opening is reflected by the reflecting member and by the reflecting surface, thus causing the slit to be illuminated.

In the pointer device, the pointer body has a conical shape. Hence, light directed into the pointer body through the bottom opening, or light directed into the pointer body through the opening formed in the side thereof and reflected by the reflecting member is attenuated in intensity to only a small degree while advancing towards the tip of the pointer body. Therefore, the light reflected and emitted through the slit is sufficiently high in intensity even at the tip of the pointer body, so that the entire pointer body is illuminated with a high degree of intensity. In the pointer body, the distance between the reflecting surface and the slit is made gradually shorter towards the tip thereof. Therefore, at the tip, the luminous flux is higher in density. Hence, the illumination remains relatively high at the tip of the pointer body; that is, the pointer body is uniformly illuminated from the base to the tip thereof. Further, the pointer body is hollow, thus contributing to a reduction in weight of the pointer.

The nature, principle, and utility of the invention will be more clearly understood from the following detailed description of the invention when read in conjunction with the accompanying drawings.

DETAILED DESCRIPTION OF THE PREFERRED EMBODIMENTS

Preferred embodiments of this invention will be described with reference to the accompanying drawings.

Figure 1:
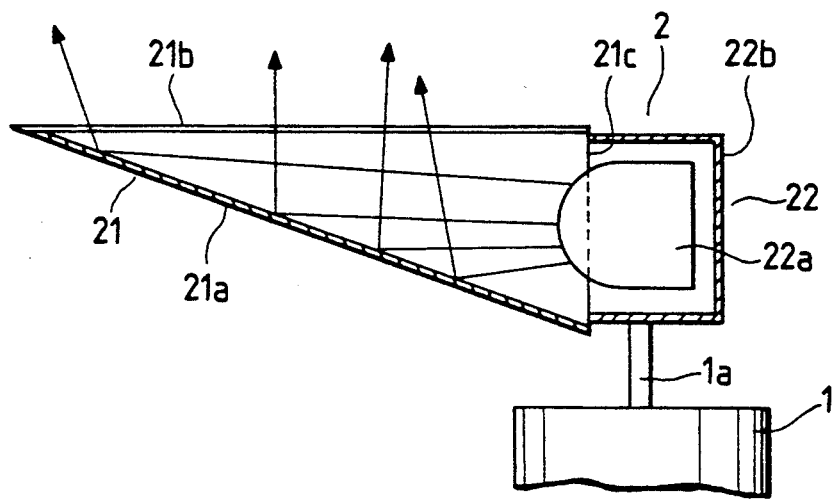
FIG. 1 is a sectional view illustrating a first embodiment of a pointer device for an instrument of a vehicle according to the present invention.

A first embodiment of a pointer device according to the invention which is provided for an instrument of a vehicle is illustrated in FIG. 1. In FIG. 1, reference numeral 1 designates a movement having a rotary shaft 1a. The movement 1 is adapted to drive a pointer 2, which is fixedly mounted on the upper end of the rotary shaft 1a.

Figure 2A:
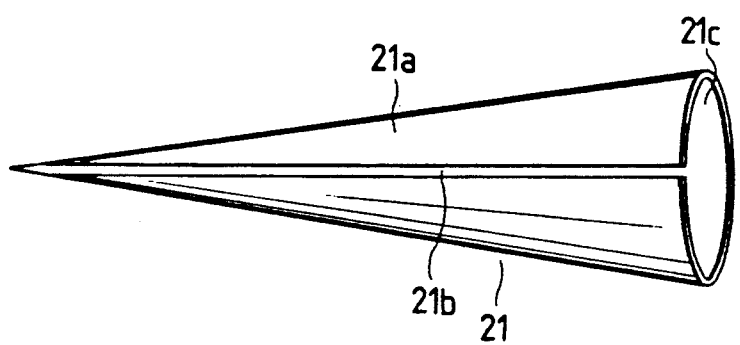
FIG. 2(a) is a perspective view showing the conical shape of the pointer body of the pointer device shown in FIG. 1
Figure 2B:
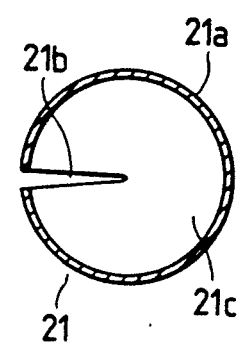
FIG. 2(b) is an end view thereof.

The pointer 2 includes a pointer body 21 which is illuminable and a pointer base 22 secured to the rotary shaft 1a of the movement 1. The pointer body 21 includes a conical, portion 21a having a circular cross section and having a longitudinal slit 21b in the wall thereof, as shown in FIGS. 2(a) and (b). On the other hand, the pointer base 22 22 includes a cover 22b made of an opaque material and having a side opening. A light source 22a such as a light emitting diode is built in the cover 22b.

The entire inner surface of the conical portion 21a is reflective. The reflecting surface may be obtained by providing a mirror finish on the inner surface, for instance, by polishing, aluminum foil bonding or vacuum evaporation, or by coating the inner surface with white paint so as to form an irregular reflecting surface. The conical pointer body 21 is coupled to the pointer base 22 such that its bottom opening 21c is engaged with the side opening of the cover 22, and the slit 21b is oriented so as to allow the operator to read the instrument (e.g., with the slit facing the scale plate).

The bottom opening of the conical body 21 is formed by sectioning the conical portion 21a at a suitable angle. That is, the conical body 21 is so cross-sectioned that, under the condition that the conical body 21 is coupled to the pointer base 22, the side wall of the conical body 21 in which the slit 21b is formed is perpendicular to the rotary shaft 1a and is disposed horizontally, as illustrated in FIG. 1. The light source 22a is fixedly mounted in the cover 22 in such a manner that its light emission directional pattern coincides with the longitudinal direction of the conical pointer body 21.

Figure 3:
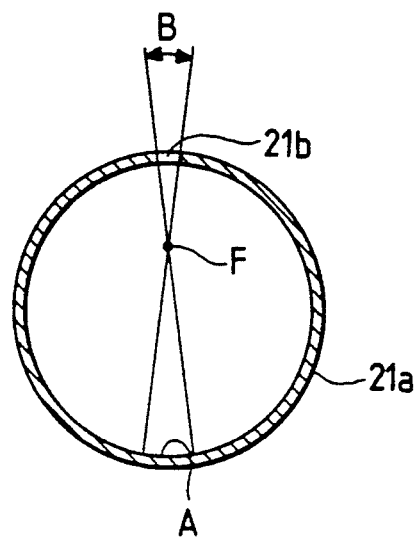
FIG. 3 is a sectional view of the conical pointer body for facilitating an understanding of the illuminating quality thereof.

The outputted light of the light source 22a is directed into the conical portion 21a through the bottom opening 21c, and is allowed to advance towards the tip of the pointer body 21 while being reflected by the reflecting surface of the latter. The output light of the light source 22a is diffused light. Therefore, light reflected by the reflecting surface is also diffused light. As shown in FIG. 3, part of the light reflected from a part A of the reflecting surface (hereinafter referred to as "a reflecting part A", when applicable) advances towards the slit 21b; that is, it is emitted outside the conical body 21a through the slit 21b. The conical portion 21a is hollow, and the inner surface is reflective as described above. Hence, the light directed into the conical portion 21a through the bottom opening 21c is attenuated in intensity only to a small degree while advancing toward the tip of the conical portion, so that the pointer body 21 is illuminated with a relatively high intensity along the slit 21b of the conical portion 21a.

In the conical pointer body, the distance between the reflecting surface and the slit 21 is gradually decreased towards the tip of the conical body. Therefore, at the tip, the luminous flux has the greatest density. Hence, the tip of the pointer body is sufficiently illuminated so that the pointer body 21 is uniformly illuminated from the base to the tip. It is of course understood the aforementioned reflecting part A are also emitted outwardly through the slit 21b. Further, the light rays are not fixed in direction so that the pointer is uniformly illuminated.

The means for energizing the light source 22a is within the knowledge of one skilled in the art. One such means is disclosed, for instance, in Japanese Patent Application (Kokai) No. 41762/1979.

In the above-described pointer device, the light source 22a is built into the cover 22b of the pointer base 2, and light from the light source 22a is directed into the conical body 21 through the bottom opening 21c. However, in the case where the output of the light source is so high in intensity that the light source can be provided on the side of the movement 1, the pointer device may be modified as shown in FIG. 4.

Figure 4:
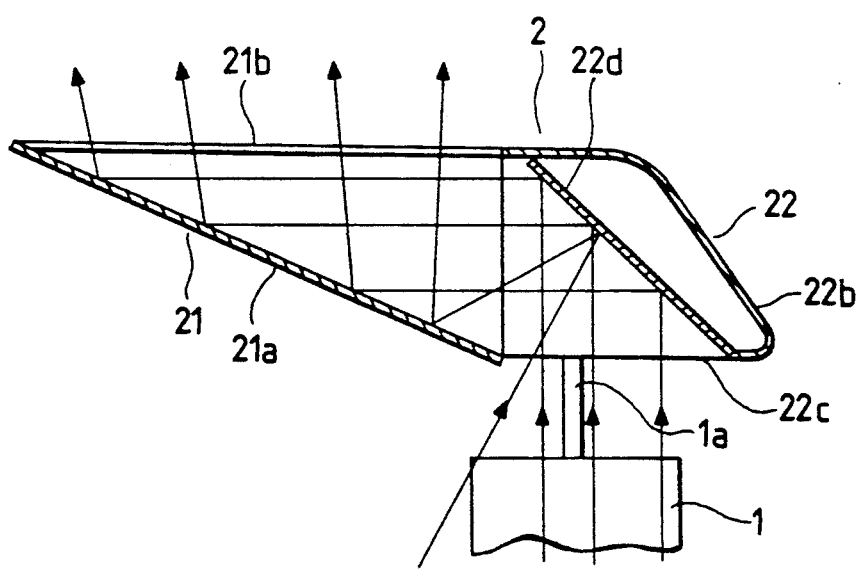
FIG. 4 is a sectional view showing a modification of the first embodiment of the pointer device according to the present invention.

Referring to FIG. 4, an opening 22c is formed in the surface of the cover 22b which faces the movement 1, and a reflecting member 22d is provided in the cover 22b so that it reflects the light through the bottom opening 21c and towards the tip of the pointer body 21. In this case, it is unnecessary to position the light source 22 inside the pointer 2, thereby allowing the weight of the pointer 2 to be reduced.

Figure 5:
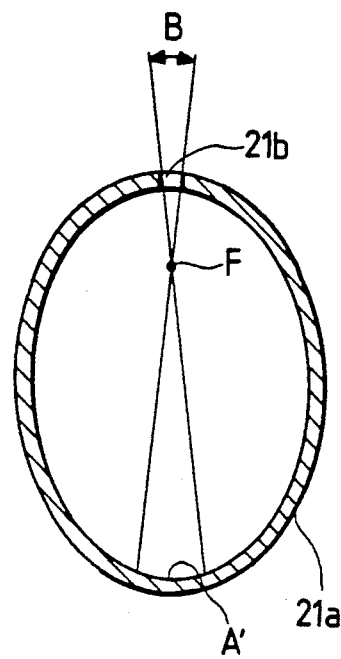
FIG. 5 is a sectional view of an elliptical pointer body for facilitating an understanding of the illuminating quality thereof.

Furthermore, in the pointer device shown in FIG. 1, the conical body 21 has a circular cross section. However, the conical body may have an elliptical cross-section as shown in FIG. 5. In the pointer device employing such a conical body 21 which is elliptic in cross-section, the part A' of the reflecting surface (hereinafter referred to as "a reflecting part A'", when applicable) which reflects the rays of light which are emitted outside through the focal pointer F and the slit 21b is larger in area than the reflecting part A of the conical body having the circular cross-section. Hence, the intensity of light emitted through the slit 21 is higher; that is, the pointer is illuminated with a higher intensity.

In addition, in the pointer device shown in FIG. 1, the light emitting diode is employed as the light source. However, the light emitting diode may be replaced with an incandescent lamp. Furthermore, in the above-described pointer device, the material of the cover 22b is not specified; however, in the case where an incandescent lamp is built in the pointer 2, it is preferable that the conical body 21a and the cover 22b be made of metal, so as to effectively irradiate heat radiated by the lamp. It is noted that the color of light illuminated by the pointer can be changed by changing the color of the inner surface of the pointer body. In addition, a lens may be provided in front of the light source, so as to form parallel rays of light. In this case, the light can be used more effectively.

Moreover, in the above-described pointer device, nothing is fitted in the slit 21b. However, in the case where the pointer suffers from a difficulty caused by the slit 21b distributing the light in a non-uniform manner, this difficulty may be eliminated by positioning a light diffusing member in the slit 21b. In this case, the rays of light directed to the slit 21b which are reflected from areas other than the reflecting parts A or A', can be effectively utilized for brightening the pointer body 21.

Now, a second embodiment of the pointer device according to the invention will be described with reference to FIGS. 6 and 7.

Figure 6:
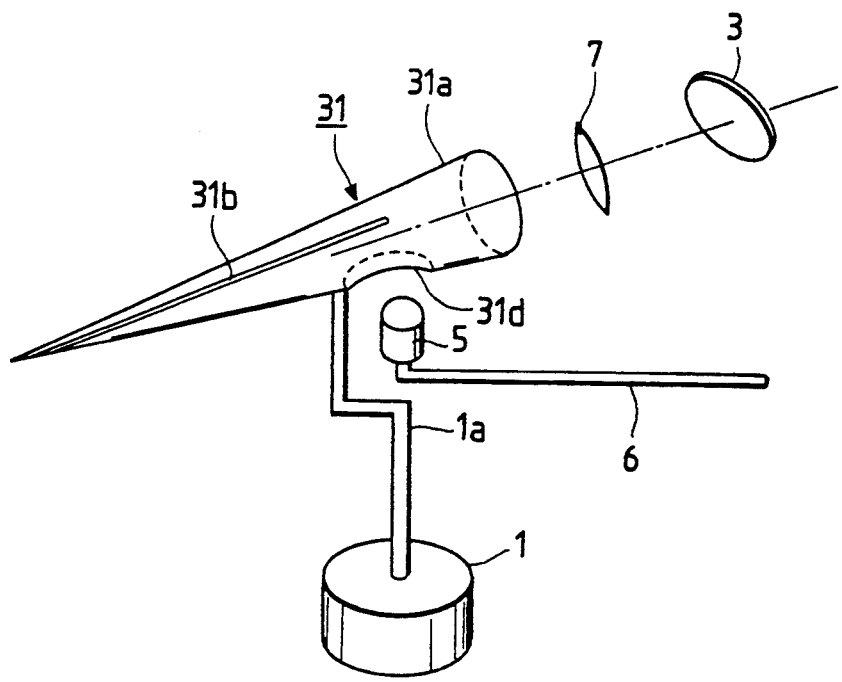
FIG. 6 is an exploded perspective view showing a second embodiment of the pointer device according to the invention.

A pointer 31 of the second embodiment of the invention, as shown in FIG. 6, comprises a conical portion 31a having a circular cross-section along its entire length in a manner which is substantially similar to the pointer body 21 shown in FIG. 1. The conical portion 31a has a longitudinal slit 31b in the side thereof. A circular opening 31d is formed in the conical portion 31a in such manner that it extends from the side having the slit 31b to the opposite side. Similarly as in the case, of the above-described pointer body 21 (FIG. 1), the inner surface of the conical portion 31a is formed into a reflecting surface. A substantially elliptic reflecting member 3 is positioned inside the conical portion 31a in such a manner that it is located behind the opening 31d as shown in FIG. 7. Further, a convex lens 7 is arranged in front of the opening 31d.

A light source 5, comprising a small light emitting element such as a light emitting diode (LED), is disposed immediately below the opening 31d. The light source 5 is supported by an arm 6, which is provided outside the range of rotation of the pointer 31. The movement 1 has an L-shaped rotary shaft 1a, as illustrated in FIG. 6. The conical portion 31a is fixedly mounted on the end of the rotary shaft, so that the light source 5 and the opening 31d are positioned in alignment with the lower base portion of the rotary shaft 1a which extends directly from the movement 1.

Hence, even when the pointer 31 is rotated together with the rotary shaft 1a of the movement 1, the positional relation between the opening 31d of the conical portion 31a and the light source is unchanged, so that light emitted from the light source 5 is applied through the opening 31d to the reflecting member 3, where it is reflected towards the tip of the pointer 31. As noted above, the conical portion 31a is hollow having an inner reflecting surface. Hence, the light directed into the conical portion through the opening 31d is attenuated in intensity only a small degree while advancing toward the tip of the pointer. Additionally, the rays of light which advance to the slit 31b while being reflected by the reflecting surface of the pointer 31 exit through the slit formed in the conical portion 31a. Therefore, the slit 31b, is illuminated with high intensity.

In the second embodiment of the pointer device shown in FIG. 6, unlike the first embodiment shown in FIG. 1 described above, the light source 5 is not arranged in the pointer 31. Therefore, lead wires can be readily connected to the light source, and accordingly the pointer 31 can be connected to the movement 1 with ease.

Figure 8:
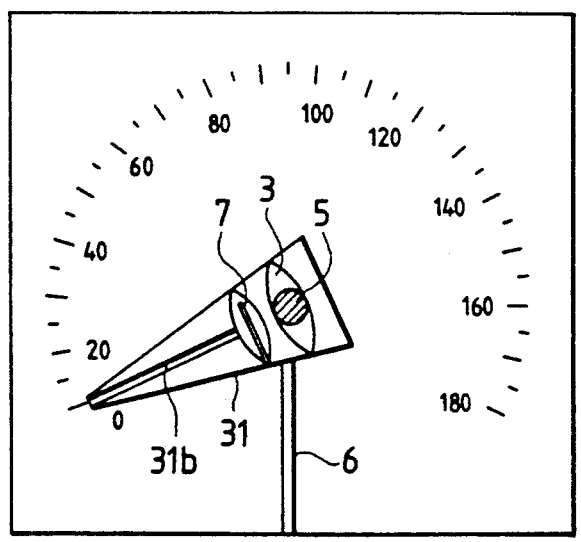
FIG. 8 is a front view of an instrument employing the pointer device shown in FIG. 6.

FIG. 8 shows an instrument which employs the pointer device of the second embodiment of the invention.

Figure 7:
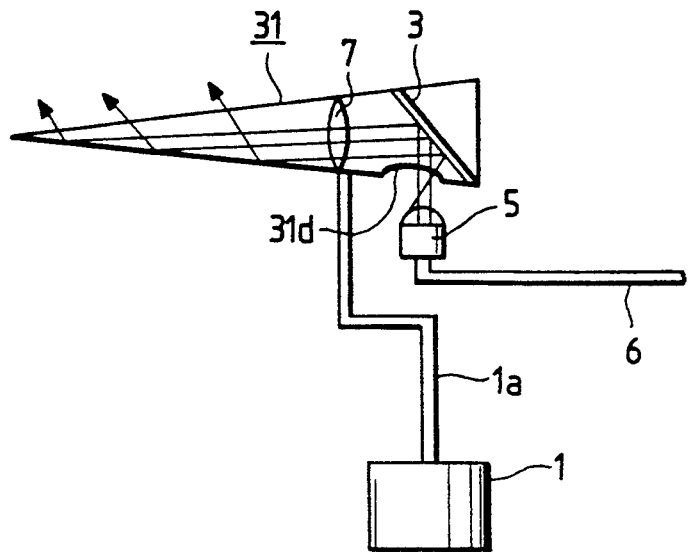
FIG. 7 is a sectional view of the pointer device shown in FIG. 6.
Figure 9:
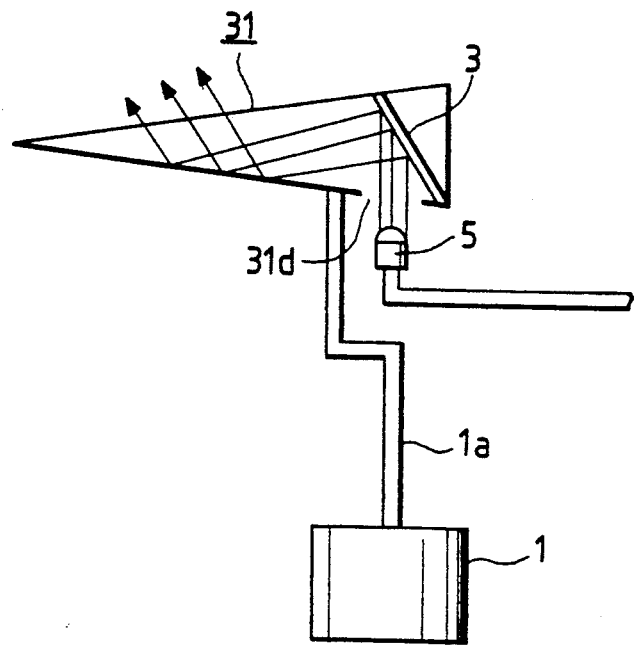
FIG. 9 is a sectional view showing a modification of the second embodiment of the pointer device according to the invention.

The pointer device shown in FIGS. 6 and 7 may be so modified that the light source 5 is a light emitting diode with a lens. In this case, as shown in FIG. 9, the lens 7 provided in front of the reflecting member is eliminated.

A third embodiment of the pointer device according to the invention will be described with reference to FIG. 10, in which parts corresponding functionally to those of the above-described first and second embodiments of the pointer device are designated by the same reference numerals or characters.

Figure 10:
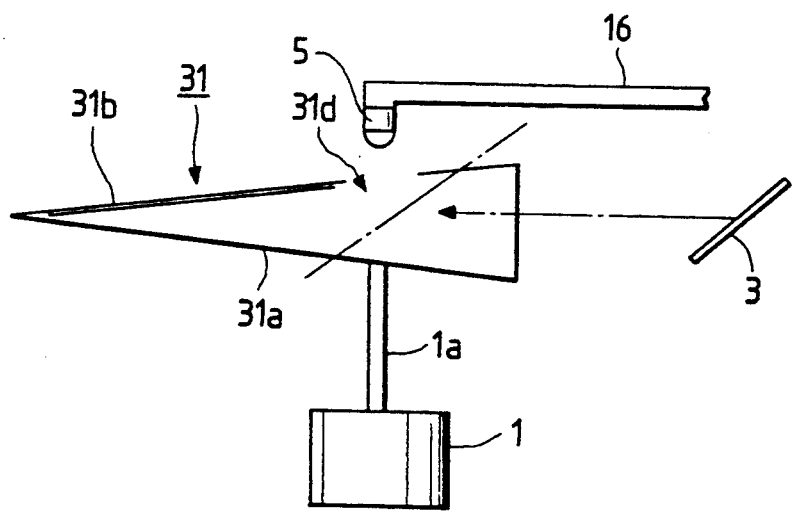
FIG. 10 is an exploded sectional view showing a third embodiment of the pointer device according to the invention.
Figure 11:
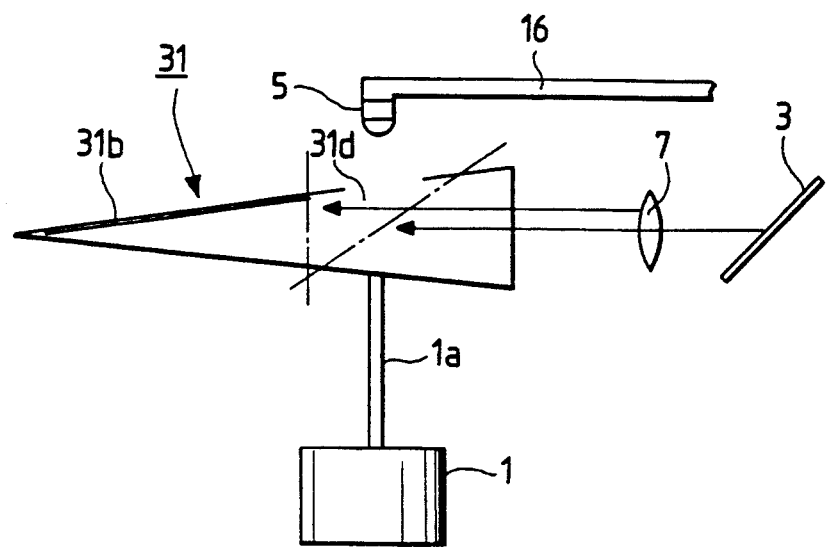
FIG. 11 is a sectional view showing a modification of the third embodiment of the pointer device according to the invention.

In the third embodiment, as shown in FIG. 10, the pointer 31 is substantially similar to the pointer of the second embodiment shown in FIG. 6; that is, the former is different from the latter only in that an opening 31d is formed in the side of the conical pointer body 31 where the slit 31b has been formed. Hence, the light source 5 for directing light to the opening 31d is positioned above the pointer 31, and supported by an arm 16, as illustrated in FIG. 10. The rotary shaft 1a of the movement 1, unlike the rotary shaft of the second example of the pointer device, is linear with the pointer body 31 fixedly mounted on the top of the rotary shaft 1a. In the case where the rays of light emitted from the light source 5 are not parallel, a lens 7 may be arranged inside the pointer body 31, as shown in FIG. 11.

Figure 12:
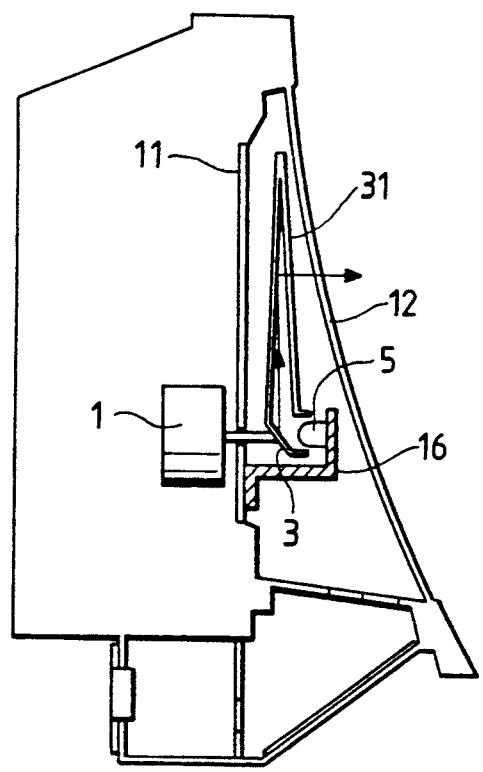
FIG. 12 is a side view showing an instrument employing the pointer device according to the third embodiment of the invention.

FIG. 12 shows an instrument employing the pointer device of the third embodiment. The instrument has a scale plate 11 in front of which the movement 1 is positioned with its rotary shaft 1a extended through the plate. The pointer body 31 is fixedly mounted on the rotary shaft 1a and a crank-shaped arm 16 is mounted on the scale plate 11 below the pointer body 31. The light source 5 is secured to the end of the arm 11 thus mounted. Hence, the light source 5 is positioned at the opening 31d so that light from the light source 5 is directed through the opening 31d into the pointer body 31 and reflected by the reflecting plate 3 towards the tip of the pointer body 31. In FIG. 12, reference numeral 12 designates a front glass plate which protects the front of the instrument.

Figure 13:
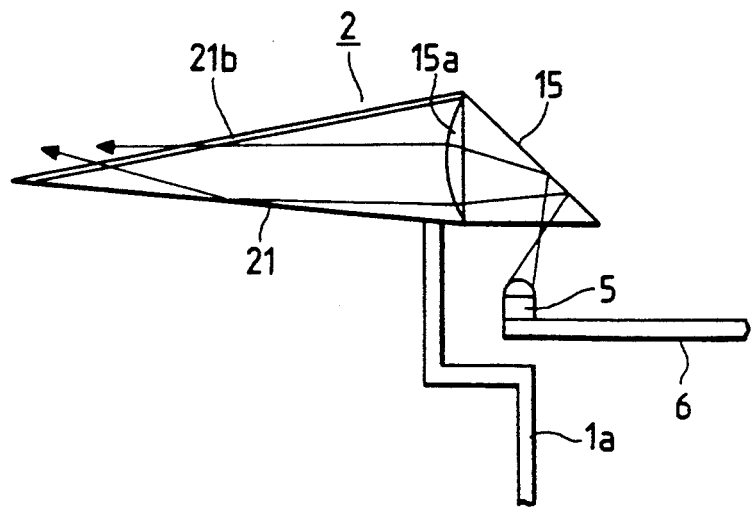
FIG. 13 is a sectional view showing a fourth embodiment of the pointer device according to the invention.

Now, a fourth embodiment of the pointer device according to the invention will be described with reference to FIG. 13, in which parts corresponding functionally to those of the above-described first through third embodiments of the pointer device are designated by the same reference numerals or characters.

Figure 14:
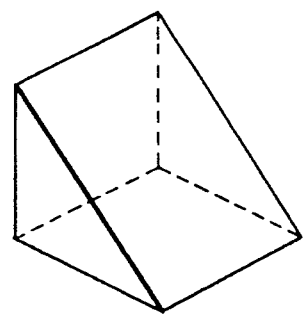
FIG. 14 is a perspective view showing a prism employed in the fourth embodiment of the pointer device according to the invention.

In the fourth embodiment of the pointer device, a specific feature of the pointer 2 resides in a prism 15 which is employed in place of the pointer base 22, which is the base end portion of the pointer body 21 in the first embodiment of the pointer device (FIG. 1). A light source 5 for directing light to the pointer 2, similarly as in the light source of the second embodiment, is supported by an arm 6 and positioned immediately below the prism 15. Light, from the light source 5 is applied to the prism 15, so that it is reflected towards the tip of the pointer body 21. The surface of the prism 15 adjacent the opening of the pointer body 21 is formed into a lens 15a, which makes the rays of light directed into the pointer body 21 through the prism be parallel to each other. In the case where the light source 5 has a lens at the front end so as to emit parallel rays of light, the lens 15a is eliminated from the prism 15; that is, an ordinary prism 15 as shown in FIG. 14 is used.

Figure 17:
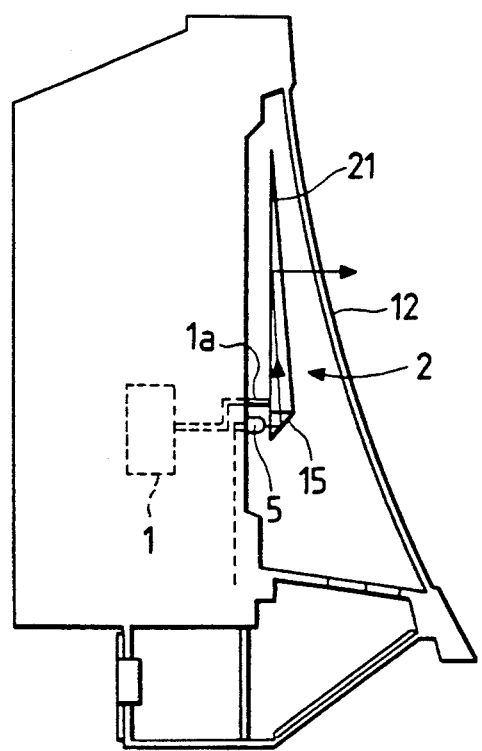
FIG. 17 is a side view of an instrument employed the pointer device shown in FIG. 13.

FIG. 17 shows an instrument employing the pointer device of this embodiment of the invention.

Figure 15:
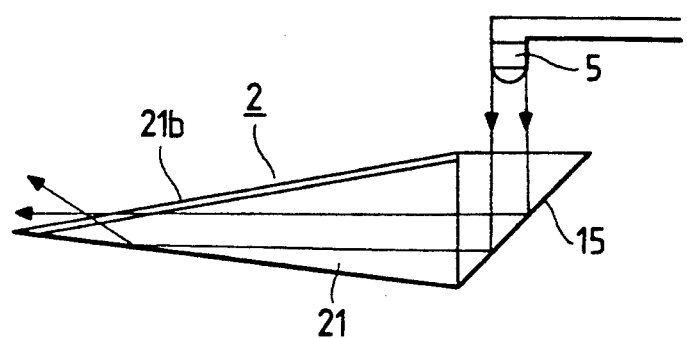
FIG. 15 is a sectional view showing a modification of the fourth embodiment of the pointer device according to the invention.
Figure 16:
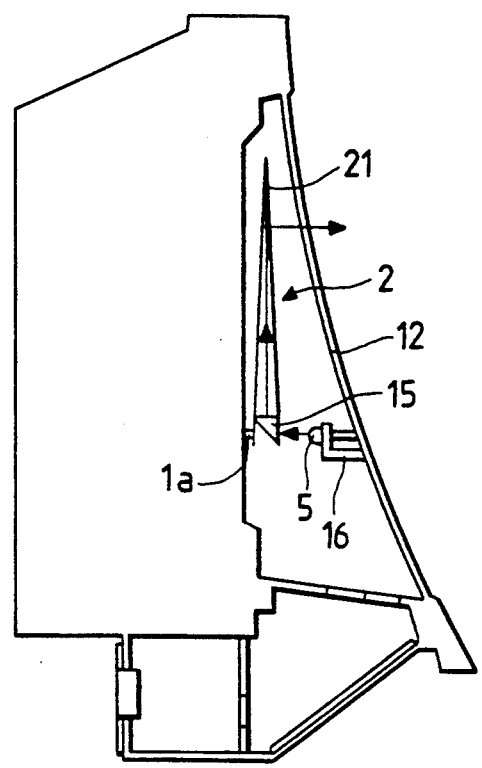
FIG. 16 is a side view of an instrument employing the pointer device shown in FIG. 15.

The pointer device of the fourth embodiment may be modified as shown in FIG. 15. That is, as in the third embodiment, the light source 5 can be positioned above the pointer 2. In this case, the prism 15 should be positioned upside down as shown in FIG. 15. FIG. 16 shows an instrument employing the pointer device of the fourth embodiment modified in this manner.

As was described above, in the pointer device according to the invention, the pointer body comprises a conical portion, and light reflected by the inner surface of the conical portion is emitted through a slit formed in the side of the conical portion. Hence, when compared with the conventional pointer, the pointer of the invention illuminates with a higher intensity, and is lower in weight. In the pointer device in which an external light source is used, the coupling structure between the pointer and the movement is simpler, and the manufacturing cost is correspondingly reduced.

While the invention has been described in connection with the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A pointer device for an instrument panel of a vehicle, comprising:
   a movement;
   a rotary shaft protruding from said movement;
   a pointer attachable to said rotary shaft so as to be rotatable therewith; and
   a light source for radiating light into said pointer, wherein said pointer includes:
   a hollow conical body portion and a base portion which is secured to said rotary shaft, wherein said body portion has a longitudinally extending slit in the side thereof and a reflective inner surface such that light emitted by said light source and directed into said body portion is reflected off said reflecting surface and through said slit.

2. The pointer device of claim 1, wherein said body portion of said pointer has a circular cross-section.

3. The pointer device of claim 2, wherein said pointer extends in a direction which is perpendicular to said rotary shaft.

4. The pointer device of claim 2, wherein said light source emits light rays in a direction which is parallel to said slit.

5. The pointer device of claim 1, wherein said light source is disposed within said base portion and oriented so as to direct said light toward a distal end of said body portion.

* * * * *